United States Patent
Sen (10) Patent No.: US 10,222,863 B1
(45) Date of Patent: Mar. 5, 2019

(54) LINEAR HAPTIC ACTUATOR INCLUDING FIELD MEMBERS AND BIASING MEMBERS AND RELATED METHODS

(71) Applicant: Apple Inc., Cupertino, CA (US)

(72) Inventor: Yi-Heng Sen, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/695,516

(22) Filed: Sep. 5, 2017

(51) Int. Cl.
G06F 3/01 (2006.01)
G08B 6/00 (2006.01)
B06B 1/02 (2006.01)
B06B 1/14 (2006.01)

(52) U.S. Cl.
CPC ............ G06F 3/016 (2013.01); B06B 1/0207 (2013.01); B06B 1/14 (2013.01); G08B 6/00 (2013.01)

(58) Field of Classification Search
None
See application file for complete search history.

(56) References Cited

U.S. PATENT DOCUMENTS

| | | | | |
|---|---|---|---|---|
| 5,013,303 A * | 5/1991 | Tamari | ............... | A61M 5/1483 128/DIG. 12 |
| 6,009,985 A * | 1/2000 | Ivers | ............... | F16F 7/1005 188/380 |
| 6,567,265 B1 * | 5/2003 | Yamamura | ............. | G11B 33/08 206/523 |
| 6,674,562 B1 * | 1/2004 | Miles | ............... | B82Y 20/00 216/24 |
| 7,554,224 B2 * | 6/2009 | Roberts | ............... | H02K 35/02 290/1 R |
| 7,993,113 B2 * | 8/2011 | Namiki | ............... | F04D 29/601 417/363 |
| 8,169,402 B2 | 5/2012 | Shahoian et al. | | |
| 8,531,063 B2 * | 9/2013 | Lee | ............... | H02K 33/16 310/16 |
| 8,552,599 B2 * | 10/2013 | Jeon | ............... | B06B 1/045 310/15 |
| 9,350,223 B2 * | 5/2016 | Furukawa | ............. | H02K 35/02 |
| 9,607,491 B1 * | 3/2017 | Mortimer | ............... | G08B 6/00 |
| 9,608,506 B2 * | 3/2017 | Degner | ............. | H02K 41/0356 |
| 9,815,085 B2 * | 11/2017 | Chun | ............... | G06F 3/016 |
| 2004/0203530 A1 * | 10/2004 | Liang | ............... | B06B 1/045 455/90.3 |

(Continued)

FOREIGN PATENT DOCUMENTS

JP 2014167772 A * 9/2014
WO 2013169299 A1 11/2013

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Chico A Foxx
(74) *Attorney, Agent, or Firm* — Allen, Dyer, Doppelt, + Gilchrist, P.A.

(57) ABSTRACT

A linear haptic actuator may include an actuator housing and at least one coil carried by the actuator housing. The linear haptic actuator may also include field members moveable along a path of travel within the actuator housing in response to the at least one coil and a respective end biasing member between each end field member and adjacent portions of the actuator housing. A respective internal biasing member may be between adjacent field members.

16 Claims, 9 Drawing Sheets

(56) References Cited

U.S. PATENT DOCUMENTS

| | | | |
|---|---|---|---|
| 2005/0200207 A1* | 9/2005 | Hasegawa | H02K 33/16 310/10 |
| 2006/0155160 A1* | 7/2006 | Melvin | A61B 17/00234 600/16 |
| 2006/0165249 A1* | 7/2006 | Sato | B06B 1/045 381/374 |
| 2008/0306332 A1* | 12/2008 | Choi | B06B 1/045 600/38 |
| 2010/0032255 A1* | 2/2010 | Conti | G05G 5/03 188/272 |
| 2010/0033030 A1* | 2/2010 | Amemiya | H02K 7/1876 310/12.16 |
| 2011/0139893 A1* | 6/2011 | Wetzel | F15D 1/00 239/102.2 |
| 2013/0328253 A1* | 12/2013 | Kraner | G05B 19/404 267/140.14 |
| 2014/0197936 A1 | 7/2014 | Biggs et al. | |
| 2014/0259473 A1* | 9/2014 | Bax | A61C 17/225 15/22.1 |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2016/0247368 A1* | 8/2016 | Chun | H02K 33/16 |
| 2017/0120297 A1* | 5/2017 | Chun | B06B 1/045 |

FOREIGN PATENT DOCUMENTS

| | | |
|---|---|---|
| WO | 2013169303 A1 | 11/2013 |
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

LINEAR HAPTIC ACTUATOR INCLUDING FIELD MEMBERS AND BIASING MEMBERS AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A linear haptic actuator may include an actuator housing and at least one coil carried by the actuator housing. The linear haptic actuator may also include a plurality of field members moveable along a path of travel within the actuator housing in response to the at least one coil and a respective end biasing member between each end field member and adjacent portions of the actuator housing. A respective internal biasing member may be between adjacent field members.

The linear haptic actuator may further include a controller configured to drive the at least one coil to move the plurality of field members in opposing directions. The linear haptic actuator may include a controller configured to drive the at least one coil to move the plurality of field members in a same direction, for example.

The plurality of field members may include a pair of field members, each having a same mass. The end biasing members each may have a same spring constant.

The actuator housing may include opposing deformable end walls coupled to respective end biasing members, for example. Each deformable end wall may have a spring constant greater than the spring constant of the end biasing members.

The linear haptic actuator may further include a respective limiter adjacent each deformable end wall. The end spring members may have a different spring constant than the at least one internal spring member, for example.

A method aspect is directed to a method of driving a linear haptic actuator that includes an actuator housing, at least one coil carried by the actuator housing, a plurality of field members moveable along a path of travel within the actuator housing in response to the at least one coil, a respective end biasing member between each end field member and adjacent portions of the actuator housing, and a respective internal biasing member between adjacent field members. The method may include using a controller to drive the at least one coil to move the plurality of field members in opposing directions.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
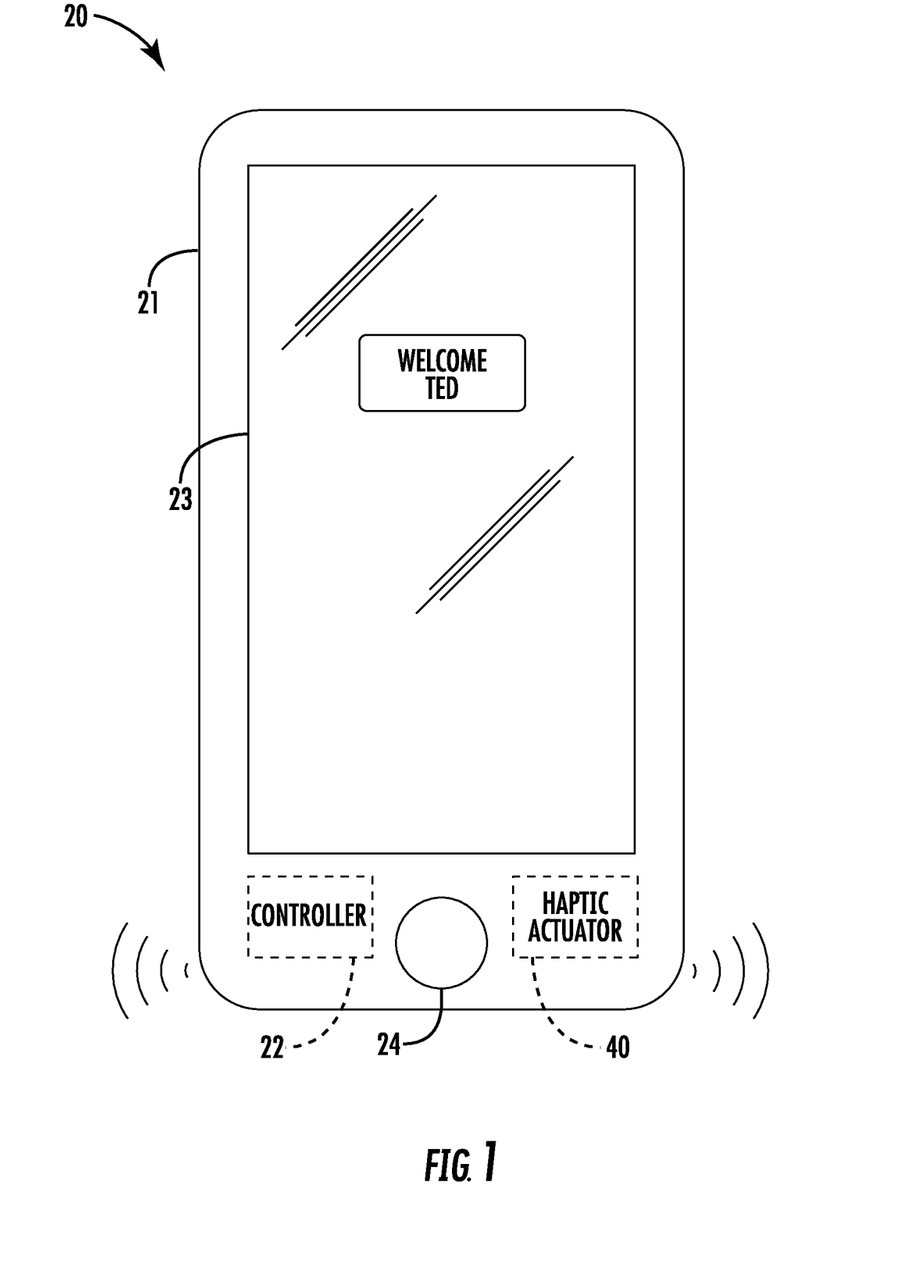
FIG. 1 is a front view of an electronic device in accordance with an embodiment.
Figure 2:
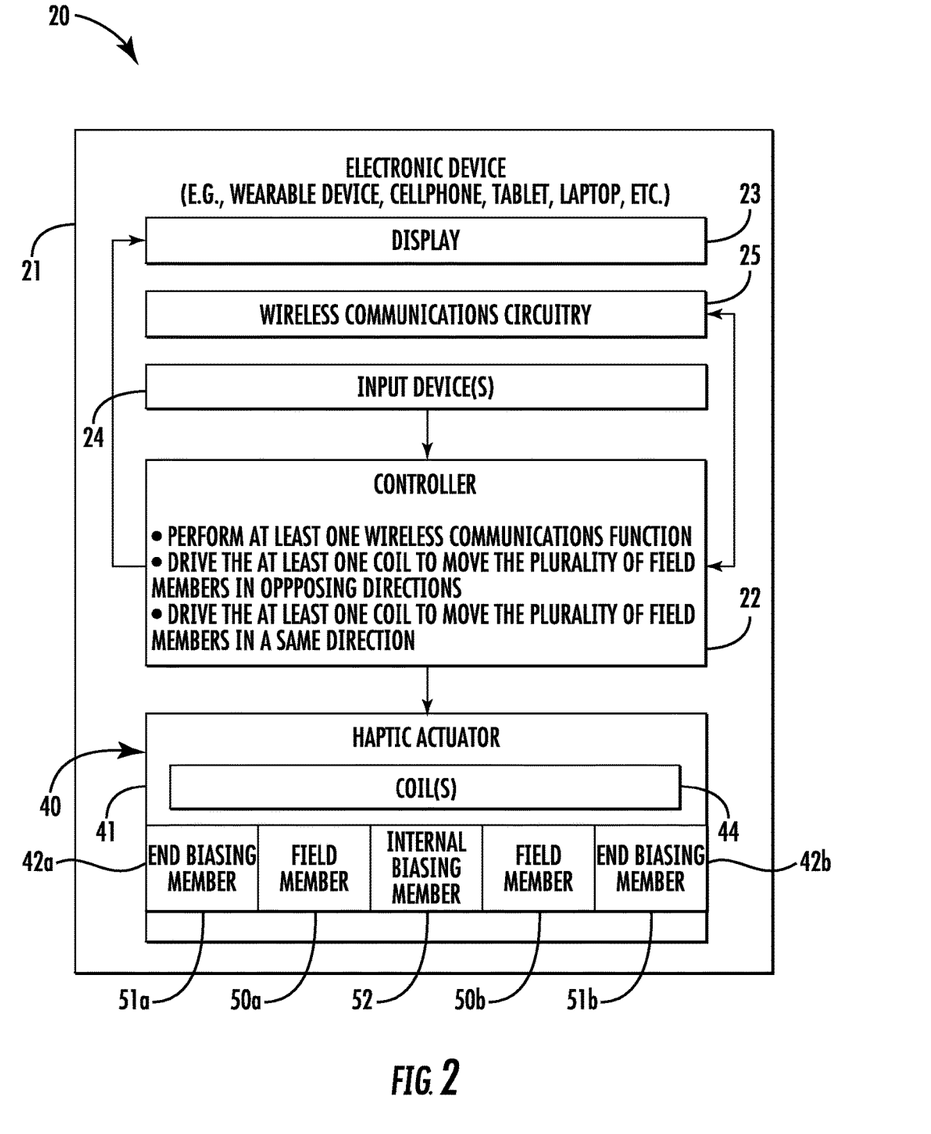
FIG. 2 is a schematic diagram of the electronic device of FIG. 1
Figure 3:
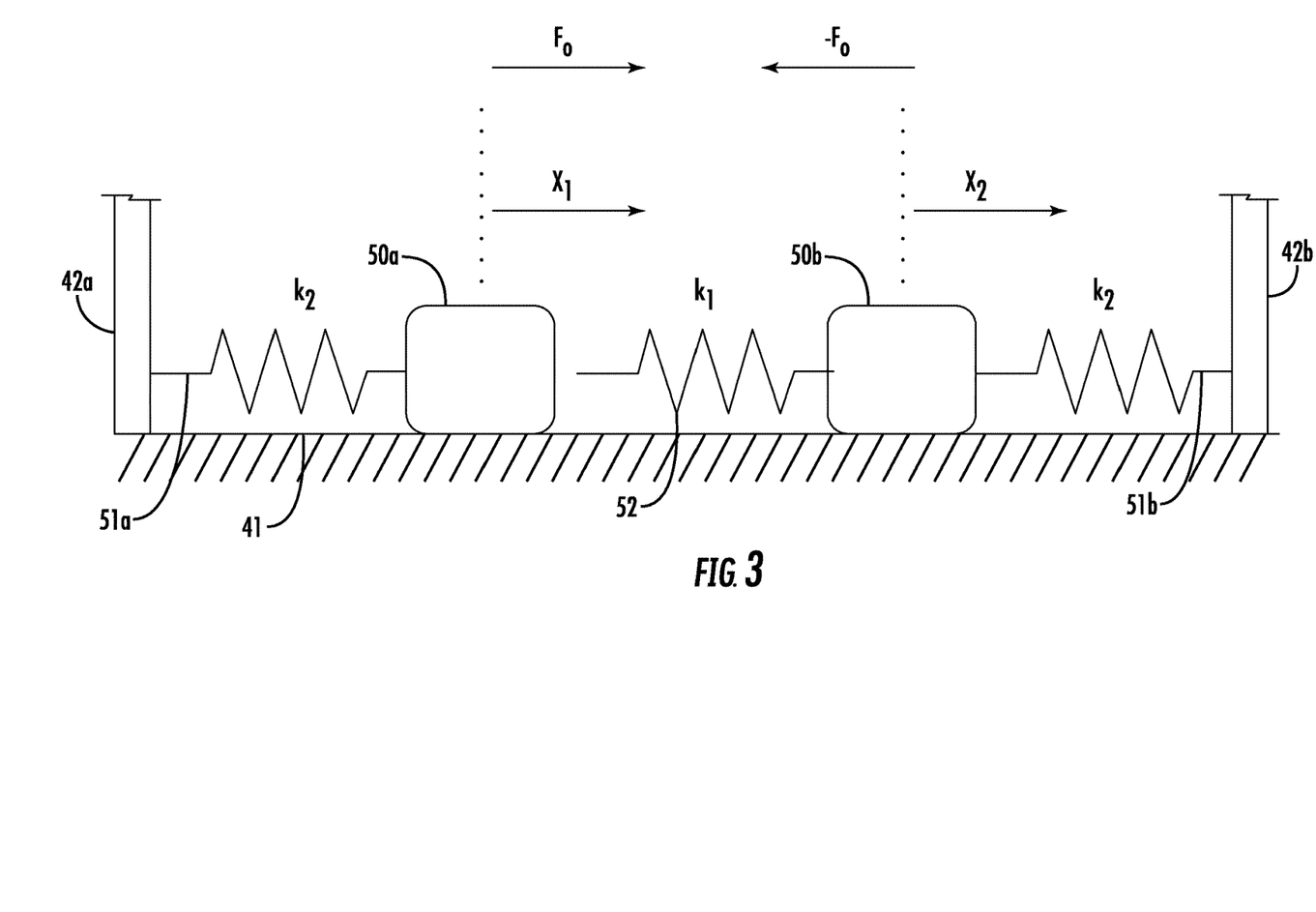
FIG. 3 is a schematic diagram of the haptic actuator of the electronic device of FIG. 1.

Referring initially to FIGS. 1-3, an electronic device 20 illustratively includes a device housing 21 and a controller 22 carried by the device housing. The electronic device 20 is illustratively a mobile wireless communications device, for example, a mobile telephone. The electronic device 20 may be another type of electronic device, for example, a wearable wireless communications device, and includes a band or strap for securing it to a user, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a light emitting diode (LED) display, for example, or may be another type of display, for example, a liquid crystal display (LCD) as will be appreciated by those skilled in the art. The display 23 may be a touch display, for example, responsive to user input.

A finger-operated user input device 24 illustratively in the form of a pushbutton switch is also carried by the device housing 21 and is coupled to the controller 22. The pushbutton switch 24 cooperates with the controller 22 to perform a device function in response to operation thereof. For example, a device function may include a powering on or off of the electronic device 20, initiating communication via the wireless communications circuitry 25, and/or performing a menu function. In some embodiments, there may not be a discrete finger-operated user input device 24 and/or when the display 23 is in the form of a touch screen display, the display may be a finger-operated input device.

The electronic device 20 illustratively includes a linear haptic actuator 40. The haptic actuator 40 is coupled to the controller 22, which determines user indications and operates the haptic actuator by way of applying power, current, or a voltage to one or more coils 44 to move a first and second or a pair of field members 50a, 50b (which also may be referred to as masses) based upon the user indication. More particularly, the haptic actuator 40 cooperates with the controller 22 to provide haptic feedback to the user. The haptic feedback may be in the form of relatively long and short vibrations or "taps", particularly, for example, when the electronic device 20 is in the form of a wearable device and the user is wearing the electronic device. The vibrations may be indicative of a message received, and the duration of the vibration may be indicative of the type of message received. Of course, the vibrations may be indicative of or convey other types of information.

While a controller 22 is described, it should be understood that the controller 22 may include one or more of a processor and other circuitry to perform the functions described herein, and some or all of the circuitry may be carried by an actuator housing and/or by the device housing 21.

Further details of the haptic actuator 40 are now described. The haptic actuator 40 includes an actuator housing 41. The actuator housing 41 includes deformable end walls 42a, 42b each having a spring constant associated therewith. The one or more coils 44 are carried by the actuator housing 41. There may be any number of coils 44 arranged in any number of configurations, as will be appreciated by those skilled in the art.

Figure 4:
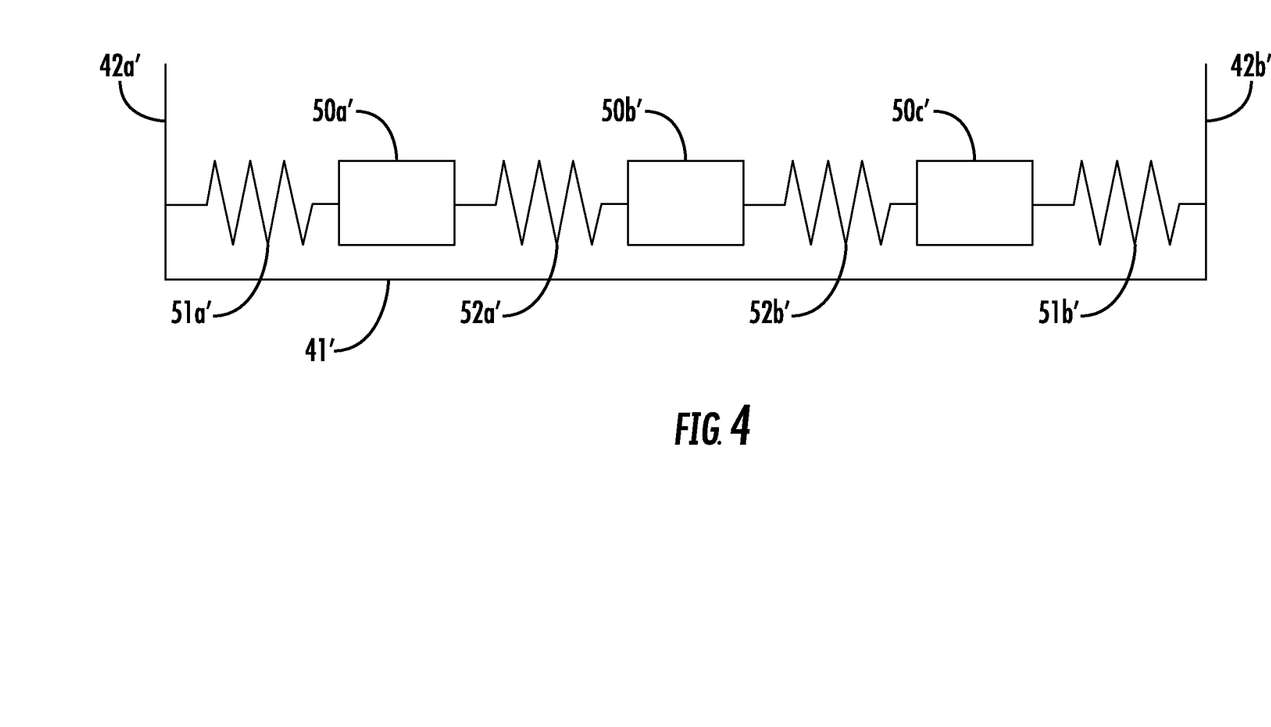
FIG. 4 is a schematic diagram of a haptic actuator in accordance with another embodiment.

The pair of field members 50a, 50b are moveable along a path of travel within actuator housing 41 in response to the coil(s) 44. In some modes of operation, the field members 50a, 50b are moveable relative to one another. Each of the pair of field members 50a, 50b have a mass associated therewith and each may include one or more permanent magnets that cooperate with the coil(s) 44 to cause movement along the path of travel. Each of the pair of field members 50a, 50b may have a same mass, for example, to provide desired haptic feedback as will be described in further detail below. While two field members 50a, 50b are illustrated, there may be more than two field members, for example, three field members 50a'-50c', as illustrated in FIG. 4.

Respective end biasing members 51a, 51b are between each end field member 50a, 50b and adjacent portions of the actuator housing 41, and more particularly, coupled to the opposing deformable end walls 42a, 42b. The end biasing members 51a, 51b have a spring constant associated therewith that is less than the spring constant of the opposing deformable end walls 42a, 42b.

In this present example embodiment of two field members 50a, 50b, each field member is an end field member. However, in embodiments where there are more than two field members 50a, 50b, for example, three as illustrated in FIG. 4, there will be two end field members 50a', 50c' and an inner field member 50b'. Each respective end biasing member 51a, 51b may be a spring, flexure, or other type of biasing member. Each of the end biasing members 51a, 51b may have a same spring constant, for example, to achieve desired operation, as will be explained in further detail below. As will be appreciated by those skilled in the art, when a coil spring, for example, is used, the field members 50a, 50b may be slidably moveable along or carried by a shaft. Alternatively, if a flexure bearing is used, there may be no shaft as the field members 50a, 50b may be suspended in equilibrium between the flexure bearings.

A respective internal biasing member 52 is between adjacent field members 50a, 50b. The internal biasing member 52 also has a spring constant associated therewith that may be different than the spring constants of the respective end biasing members 51a, 51b. In the present example embodiment, since there are two field members 50a, 50b, a single internal biasing member 52 is between the first and second field members 50a, 50b. In embodiments, where there are three field members, for example as illustrated in FIG. 4, there are two internal biasing members 52a', 52b' between the first and second field members 50a', 50b' and the second and third field members 50b', 50c'. Similarly to the end biasing members 51a, 51b, each internal biasing member 52 may be a spring, flexure, or other type of biasing member.

The configuration of the field members 50a, 50b and end and internal biasing members 51a, 51b, 52 permit operation thereof in different modes. A first mode may be considered a localized mode whereby haptic feedback may be focused in the area around the haptic actuator 40, for example where in the device housing 21 the haptic actuator is mounted. A second mode may provide haptic feedback felt throughout the device 20 or the device housing 21. The second mode may be particularly undesirable for use with relatively lightweight electronic devices, such as, for example, wearable devices, since the user may find it uncomfortable with the entire electronic device vibrating or shaking when the haptic actuator is operated.

Figure 5:
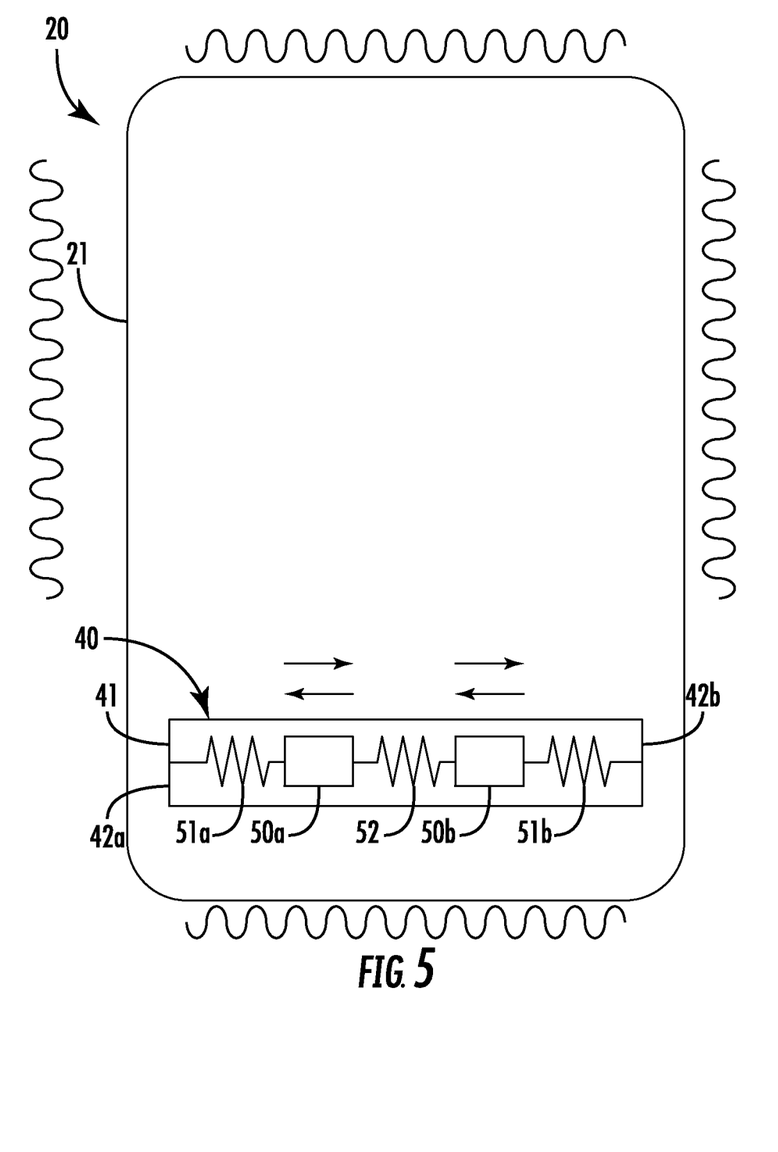
FIG. 5 is a schematic diagram illustrating whole device haptic feedback in accordance with an embodiment.
Figure 6:
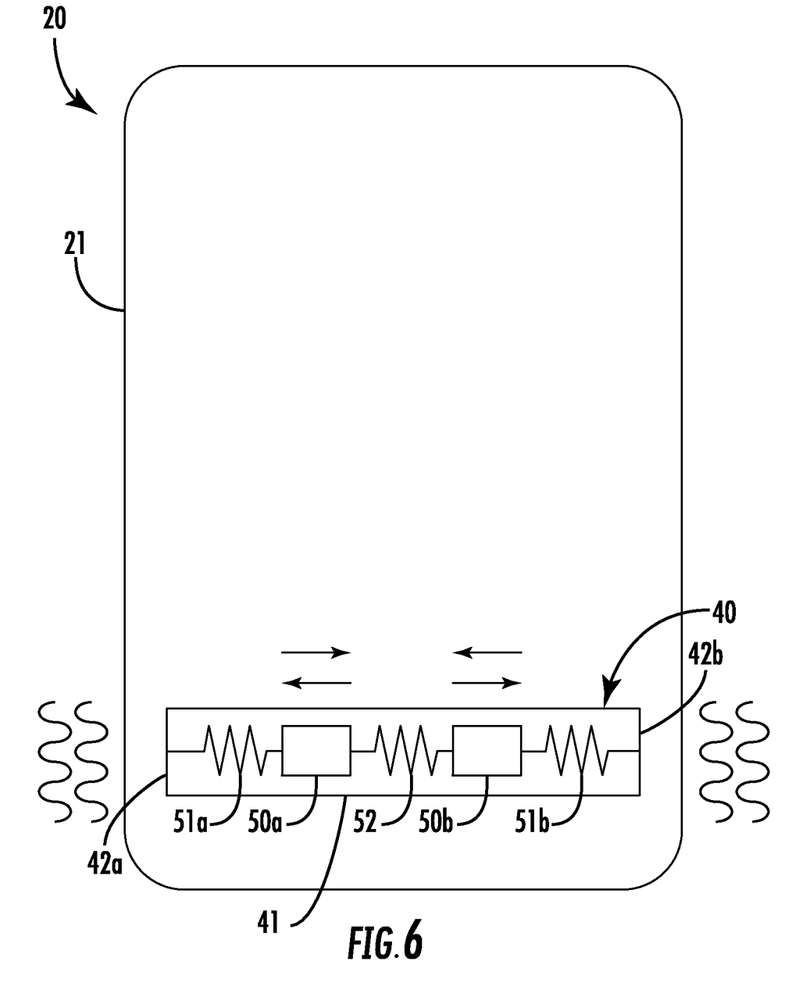
FIG. 6 is a schematic diagram illustrating localized haptic feedback in accordance with an embodiment.

Referring additionally to FIGS. 5 and 6, to provide localized haptic feedback (i.e., the first mode) the controller 22 drives the coils 44 to move the field members 50a, 50b, in opposing directions (FIG. 6). As will be appreciated by those skilled in the art, to provide the localized haptic feedback, no or relatively small net motion is introduced to the electronic device 20. To provide haptic feedback throughout the device housing 21, the controller 22 drives the coils 44 to move the field members 50a, 50b in the same direction (FIG. 5).

Advantageously, the haptic actuator 40 may not induce any net shaking motion to the entire electronic device, while providing localized pinpoint haptic feedback where it is mounted to electronic device housing 21 when localized haptic feedback is desired. Moreover, the haptic actuator 40 has a smaller form factor needed than, for example, two separate haptic actuators each operating in the desired mode of operation as an extra housing, mounting location in the device housing, associated electronics, etc. are generally not needed as these are "integrated" with respect to the embodiments of the haptic actuator 40 described herein.

Referring particularly to FIG. 3, the localized haptics provided by the haptic actuator 40 can be illustrated through a vibration dynamics analysis. FIG. 3 illustrates the equivalent vibration model for the haptic actuator 40 with the direction of two actuation forces opposite to each other. The first and second field members 50a, 50b are the same weight, and the spring constants of the end biasing members 51a, 51b are the same. The controller 22 may drive the coils 44 to move the haptic actuator 40 with any waveform, and the model assumes the boundaries (end walls 42a, 42b) are solid (i.e., a very large spring constant ($k_2$) compared to the respective end biasing members 51a, 51b).

The governing dynamics equation of the system is:

$$m \times \ddot{X}_1 F_0 + k_1 \times (X_2 - X_1) - k_2 \times X_1$$

$$m \times \ddot{X}_2 - F_0 + k_1 \times (X_1 - X_2) - k_2 \times X_2$$

Through derivation from the differential equations, above, there are two resonance modes:

$$w_1 = \sqrt{\frac{k_2}{m}}$$

$$w_2 = \sqrt{\frac{k_2 + 2 \times k_1}{m}}$$

When the two actuation forces are in the same direction, the first and second field members 50a, 50b travel together in the same direction for the entire duration, an thus acting as a typical haptic actuator (i.e., operating to provide haptic feedback to the entire device housing 21), which induces a net vibe motion to the entire device 20. After the actuation forces are turned off, for example, the first and second field members 50a, 50b continue to resonate in the same mode with natural frequency=$w_1$ (referred to as "net resonance"). In contrast, when the two actuation forces $F_0$ are in opposite directions, the first and second field members 50a, 50b vibrate in opposite directions under the same displacement/velocity magnitude for the entire duration. After the actuation forces are turned off simultaneously, the first and second field members 50a, 50b continue to resonate with the second resonance mode=$w_2$ (referred to as "self-resonance"). In other words, before or after the forces are turned off, there typically is no net vibration to the entire device 20, but the force exerted by the springs ($k_2$) on each of end wall 42a, 42b of the actuator housing 41 will be tangible at where it is mounted. Note that as long as the magnitude of the two actuation forces are the same, the system model for the haptic actuator 40 will apply regardless of the $F_0$ waveform (square, sinusoidal, and etc.).

Figure 7:
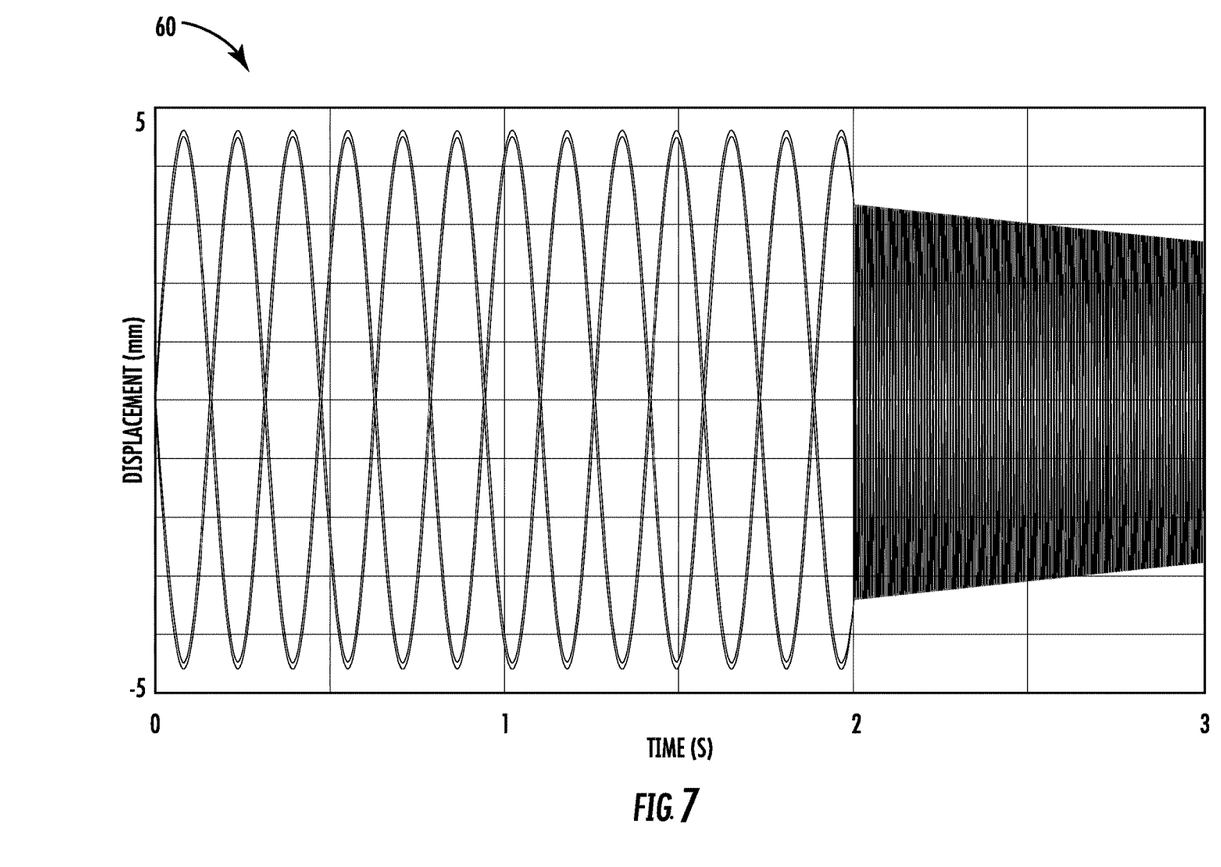
FIG. 7 is a graph illustrating field member displacement during operation of a haptic actuator in accordance with an embodiment.
Figure 8:
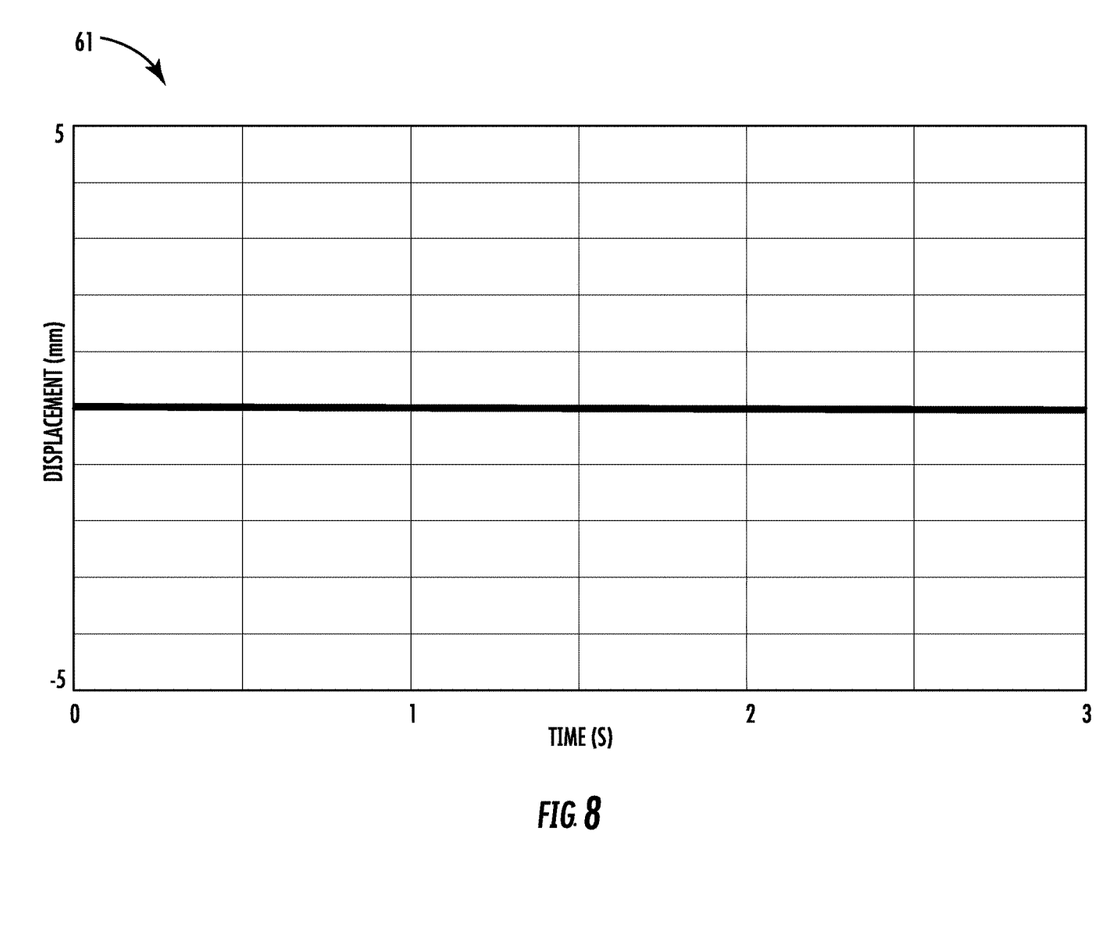
FIG. 8 is a graph illustrating a difference of displacement between field members in accordance with an embodiment.

Simulated vibration analysis was performed with respect to the haptic actuator 40 and model illustrated in FIG. 3. The graph 60 in FIG. 7 illustrates displacement from the first and second field members 50a, 50b when actuated by two equal but opposite actuation forces that lasted from 0-2 seconds, and turned off afterwards. The displacements are the same and opposite to each other during operation, for example, when the controller 22 drives the coil 44 to move the field members 50a, 50b in opposing directions. It should be noted that the oscillation frequency changed to the natural resonant (self-resonance) frequency after the force is turned off. Accordingly, a user can feel the localized haptic feeling near where the haptic actuator 40 is mounted within the device housing 21. The graph 61 in FIG. 8 illustrates no net motion from the difference of displacement between the first and second field members 50a, 50b.

Simulation software was used to simulate and confirm that the aforementioned vibration dynamics under the self-resonance mode (direction of two driving force is opposite to each other). Here the weight of both field members 50a, 50b is 1 gram, $k_1$=1000 N/m, and $k_2$=200 N/m, and the magnitude of the two actuation forces (sine wave) was $F_0$=10N, and its driving frequency was 20 Hz from 0-2 seconds. The force or the driving of the coils 44 to move the first and second field members 50a, 50b is turned off after 2 seconds. The resulting maximum displacement for the two end biasing members 51a, 51b mounted at the opposing deformable end walls 42a, 42b was about ~5 mm, which translates into ~1N at each end to a user.

As will be appreciated by those skilled in the art, the vibration dynamics may be compromised by the mounting boundary (i.e., end walls). Thus, as noted above, it may be particularly desirable to make the opposing end walls 42a, 42b of the actuator housing 41 relatively thin or deformable (i.e., not a perfectly rigid boundary) to transfer the pinpoint haptic feeling to the user.

The surface of the device housing 21 where the haptic actuator housing 41 is mounted may be flush with the adjacent surface of the device for improved aesthetics. However, during vibration, the respective deformable end wall 42a, 42b may move inward as a result of the deformable surface design.

Figure 9:
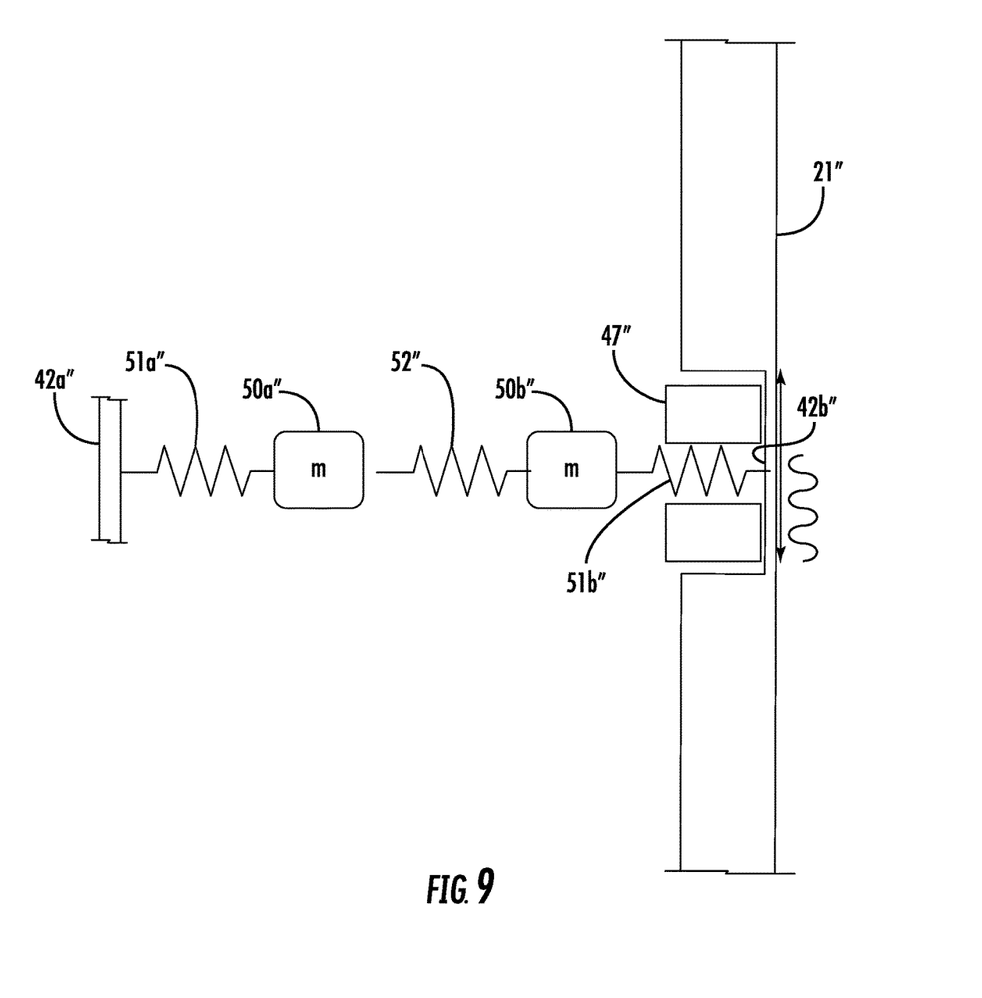
FIG. 9 is a schematic diagram of a portion of an electronic device and haptic actuator according to another embodiment.

Referring to FIG. 9, another embodiment may address the inward movement of the deformable end wall 42a", 42b". For a pinpoint or localized haptic feedback, total "stress" rather than "force" for which the user's experience may be dependent. The haptic stress can be maximized by minimizing or reducing the contact area for the user. Accordingly, the spring constant $k_2$ of the respective end biasing members 51a", 51b" may be relatively small compared to the equivalent spring constant of the deformable end wall 42a",42b". Thus, a respective limiter 47" adjacent each deformable end wall 42a", 42b" may reduce the area having inward motion, and thus, not visible from the exterior of the device housing 21".

A method aspect is directed to a method of driving a linear haptic actuator 40 that includes an actuator housing 41, at least one coil 44 carried by the actuator housing, a plurality of field members 50a, 50b moveable along a path of travel within the actuator housing in response to the at least one coil, a respective end biasing member 51a, 51b between each end field member and adjacent portions of the actuator housing, and a respective internal biasing member 52 between adjacent field members. The method includes using a controller 22 to drive the at least one coil 44 to move the plurality of field members 50a, 50b in opposing directions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A linear haptic actuator comprising:
   an actuator housing comprising opposing deformable end walls;
   at least one coil carried by the actuator housing;
   a plurality of field members moveable along a path of travel within the actuator housing in response to the at least one coil, the plurality of field members comprising end field members;
   a respective end spring member between each end field member and adjacent portions of the actuator housing, each end spring member being coupled to a respective opposing deformable end wall and having a spring constant less than or equal to a spring constant of each opposing deformable end wall; and
   a respective internal spring member between adjacent ones of the plurality of field members.
2. The linear haptic actuator of claim 1 further comprising a controller configured to drive the at least one coil to move the plurality of field members in opposing directions.

3. The linear haptic actuator of claim 1 further comprising a controller configured to drive the at least one coil to move the plurality of field members in a same direction.

4. The linear haptic actuator of claim 1 wherein the plurality of field members comprises a pair of field members, each having a same mass.

5. The linear haptic actuator of claim 1 wherein the end spring members each has a same spring constant.

6. The linear haptic actuator of claim 1 further comprising a respective limiter adjacent each deformable end wall.

7. The linear haptic actuator of claim 1 wherein the end spring members have a different spring constant than the at least one internal spring member.

8. An electronic device comprising:
a device housing;
wireless communications circuitry carried by the device housing;
a linear haptic actuator carried by the device housing and comprising
an actuator housing comprising opposing deformable end walls;
at least one coil carried by the actuator housing,
a plurality of field members moveable along a path of travel within the actuator housing in response to the at least one coil, the plurality of field members comprising end field members,
a respective end spring member between each end field member and adjacent portions of the actuator housing, each end spring member being coupled to a respective opposing deformable end wall and having a spring constant less than or equal to a spring constant of each opposing deformable end wall, and
a respective internal spring member between adjacent ones of the plurality of field members; and
a controller configured to cooperate with the wireless communications circuitry and the linear haptic actuator to perform at least one wireless communications function and selectively operate the linear haptic actuator, respectively.

9. The electronic device of claim 8 wherein the controller is configured to drive the at least one coil to move the plurality of field members in opposing directions.

10. The electronic device of claim 8 wherein the controller is configured to drive the at least one coil to move the plurality of field members in a same direction.

11. The electronic device of claim 8 wherein the plurality of field members comprises a pair of field members, each having a same mass.

12. The electronic device of claim 8 wherein the end spring members each has a same spring constant.

13. A method of driving a linear haptic actuator comprising an actuator housing having opposing deformable end walls, at least one coil carried by the actuator housing, a plurality of field members moveable along a path of travel within the actuator housing in response to the at least one coil, the plurality of field members comprising end field members, a respective end spring member between each end field member and adjacent portions of the actuator housing, each end spring member being coupled to respective opposing deformable end walls and having a spring constant less than or equal to a spring constant of each opposing deformable end wall, and a respective internal spring member between adjacent ones of the plurality of field members, the method comprising:
using a controller to drive the at least one coil to move the plurality of field members in opposing directions.

14. The method of claim 13 further comprising using the controller to drive the at least one coil to move the plurality of field members in a same direction.

15. The method of claim 13 wherein the plurality of field members comprises a pair of field members, each having a same mass.

16. The method of claim 13 wherein the end spring members each has a same spring constant.

* * * * *